(12) United States Patent
Cahill, Jr. et al.

(10) Patent No.: US 6,749,885 B2
(45) Date of Patent: Jun. 15, 2004

(54) β-GLUCAN PROCESS, ADDITIVE AND FOOD PRODUCT

(75) Inventors: Anthony P. Cahill, Jr., Amana, IA (US); Douglas J. Fenske, Waconia, MN (US); Mark Freeland, Stockton, NJ (US); Gene W. Hartwig, Alexandria, MN (US)

(73) Assignee: Quaker Oats/Rhone-Poulenc Partnership, Cranbury, NJ (US)

( * ) Notice: Subject to any disclaimer, the term of this patent is extended or adjusted under 35 U.S.C. 154(b) by 0 days.

(21) Appl. No.: 10/384,158

(22) Filed: Mar. 7, 2003

(65) Prior Publication Data

US 2003/0148015 A1 Aug. 7, 2003

Related U.S. Application Data

(62) Division of application No. 09/733,509, filed on Dec. 8, 2000, now Pat. No. 6,531,178.

(51) Int. Cl.[7] .................................................. A23L 1/28
(52) U.S. Cl. ........................ 426/655; 426/431; 426/425
(58) Field of Search ................................. 426/655, 431, 426/425

(56) References Cited

U.S. PATENT DOCUMENTS

| | | | |
|---|---|---|---|
| 3,539,365 A | 11/1970 | Durand et al. | |
| 4,028,468 A | 6/1977 | Hohner et al. | 426/436 |
| 4,220,287 A | 9/1980 | Boczewski | 241/9 |
| 4,263,334 A | 4/1981 | McGinley | |
| 4,311,714 A | 1/1982 | Goering et al. | 426/28 |
| 4,497,840 A | 2/1985 | Gould et al. | 426/560 |
| 4,620,981 A | 11/1986 | Gordon et al. | 426/448 |
| 4,804,545 A | 2/1989 | Goering et al. | 426/28 |
| 4,996,063 A | 2/1991 | Inglett | 426/21 |
| 5,082,673 A | 1/1992 | Inglett | 426/21 |
| 5,106,640 A | 4/1992 | Lehtomaki et al. | 426/436 |
| 5,169,660 A | 12/1992 | Collins et al. | 426/271 |
| 5,183,677 A | 2/1993 | Lehtomaki et al. | 426/436 |
| 5,275,830 A | 1/1994 | Smith | 426/93 |
| 5,275,831 A | 1/1994 | Smith et al. | 426/93 |
| 5,380,542 A | 1/1995 | Jenkins et al. | 426/573 |
| 5,458,893 A | 10/1995 | Smith | 426/18 |

(List continued on next page.)

FOREIGN PATENT DOCUMENTS

| | | |
|---|---|---|
| HU | 66315 A | 11/1994 |
| JP | 080154695 A | 6/1996 |
| WO | 0 515 216 A2 | 5/1992 |
| WO | WO 94/28743 | 12/1994 |
| WO | WO 96/28476 | 9/1996 |
| WO | WO 96/31128 | 10/1996 |
| WO | WO 98/13056 | 4/1998 |
| WO | WO 98/50398 | 11/1998 |
| WO | WO 99/08546 | 2/1999 |
| WO | WO 99/61480 | 12/1999 |
| WO | WO 00/24270 | 5/2000 |
| WO | WO 00/49052 | 8/2000 |

OTHER PUBLICATIONS

Gallagher, Daniel D., Wood, Kimberly J., Gallaher, Cynthia M., Marquart, Leonard F., Engstrom, Alta M., Intestinal Contents Supernatant Viscosity of Rats Fed Oat–Based Muffins and Cereal Products, vol. 76, No. 1, (1999).

*Primary Examiner*—Anthony Weier
(74) *Attorney, Agent, or Firm*—Lars S. Johnson; James D. Ryndak

(57) ABSTRACT

The method for abstracting high levels of β-glucan from a grain product such as oat or barley grain to produce a β-glucan product containing at least about 18% by weight β-glucan is provided. The β-glucan product can be produced as an agglomerated food additive having at least about 18% by weight β-glucan. Methods are provided for enriching a food product with the β-glucan agglomerated food additive to produce an enriched resulting food product.

22 Claims, 1 Drawing Sheet

U.S. PATENT DOCUMENTS

| | | | |
|---|---|---|---|
| 5,512,287 A | 4/1996 | Wang et al. | 424/195.1 |
| 5,518,710 A | 5/1996 | Bhatty | 424/195.1 |
| 5,686,123 A | 11/1997 | Lindahl et al. | 426/28 |
| 5,723,162 A | 3/1998 | Whalen et al. | 426/28 |
| 5,846,590 A | 12/1998 | Malkki et al. | 426/443 |
| 5,968,811 A | 10/1999 | Greenshields | 435/255.2 |
| 6,020,016 A | 2/2000 | Castleberry | 426/590 |
| 6,060,519 A | 5/2000 | Inglett | 516/77 |
| 6,083,547 A | 7/2000 | Katta et al. | 426/443 |
| 6,113,908 A | 9/2000 | Paton et al. | 424/195.1 |
| 6,197,952 B1 | 3/2001 | Fox | |
| 6,624,300 B2 * | 9/2003 | Potter et al. | |

* cited by examiner

β-GLUCAN PROCESS, ADDITIVE AND FOOD PRODUCT

CROSS-REFERENCE TO RELATED APPLICATIONS

This application is a division of application Ser. No. 09/733,509, filed Dec. 8, 2000, now U.S. Pat. No. 6,531,178.

FIELD OF THE INVENTION

The present invention relates to a method for extracting high levels of β-glucan from a grain product such as oat or barley grain to produce a β-glucan product containing at least about 18% by weight β-glucan. The present invention also relates to an agglomerated food additive having at least 18% by weight β-glucan and to a method of enriching a food product with β-glucan using the agglomerated high content β-glucan food additive.

BACKGROUND OF THE INVENTION

Various sources of soluble dietary fibers have attracted much attention in recent years for their positive nutritional attributes. One such soluble dietary fiber, β-glucan, is a naturally occurring polysaccharide found in the cell walls of grains such as wheat, oats and barley. When incorporated into a person's diet, β-glucan has been found to aid in the digestive process, enhance the immune system and help protect against bacteria, viruses and diseases. β-glucan is known to reduce both serum cholesterol and triglyceride levels. Taken regularly, β-glucan has also been found to reduce the risk of coronary heart disease.

β-glucan occurs in quantity in the cell wall fibers of oats and barley grain. Despite these seemingly abundant sources, current methods to recover β-glucan have been met with limited success. Known methods to isolate β-glucan from its native endosperm wall are either low in yield or involve detailed chemical processes and extensive reaction times which make such processes commercially unappealing.

A need exists for an efficient process to produce a product having high concentrations of β-glucan that can be commercially practiced. A need also exists for a high concentration β-glucan food additive that can be readily incorporated into various types of food products with a minimum amount of work and disruption of the food product to produce a resulting food product having a suitable concentration of β-glucan to achieve the desired health benefits and/or amount of fiber, particularly on a per serving basis.

SUMMARY OF THE INVENTION

Accordingly, one aspect of the present invention relates to a simple, cost-effective and commercially attractive method to produce a high concentration β-glucan product from a grain product. In accordance with one aspect of the present invention, the process for preparing a high concentration β-glucan product includes forming an aqueous slurry of a β-glucan-containing grain product having a relatively low concentration of β-glucan (typically less than 8% by weight), the slurry typically having a temperature in an operating temperature range of from about 110° F. to about 140° F. Thereafter, the pH of the aqueous slurry is adjusted to be in the range of from about 7.9 to about 10.0 (preferably 8.1) while maintaining the slurry in the operating temperature range. The pH-adjusted slurry is then held in the operating temperature range for at least about 50 minutes to about 120 minutes. Thereafter, the slurry is acidified to a separating pH in the range of from about 4.0 to about 4.8, preferably 4.2 to about 4.8. The acidified slurry is then separated while at the separating pH to form a β-glucan rich supernatant fraction having a β-glucan concentration on a dry weight basis of the supernatant of from about 18% to about 30%.

In accordance with another aspect of the process of the present invention, at least 80% of the β-glucan in the grain product is extracted and recovered in the β-glucan containing supernatant fraction.

In accordance with another aspect of the process of the present invention, sodium hydroxide is utilized as the base reagent and hydrochloric acid is used as the acidifying agent.

In accordance with yet another aspect of the process of the present invention, the β-glucan containing supernatant fraction is separated by decantation, centrifugation and spray drying.

In accordance with another aspect of the invention, a water soluble high concentration β-glucan food additive is provided. The food additive contains at least about 18% by weight β-glucan. The food additive is used to increase the nutritional benefits of numerous types of food products by incorporating a desired amount of the β-glucan food additive into the food product. Any suitable food product can be used in accordance with the invention, whether liquid, solid, semi-solid or semi-liquid, such as meat, cheese, fish, poultry, eggs, beverages, baked goods, beverage mixes, health bars, nutritional supplements and tablets, by way of example, but not limitation.

In accordance with another aspect of the invention, the β-glucan food additive produced by the process previously described is agglomerated into particles having a size in the range of about 75 to about 840 microns (micrometers) which facilitates its use as a functional β-glucan ingredient in either wet or dry food products. β-glucan in such form is readily dispersable into such food products while subjecting the food product to a minimum amount of mixing and shear forces, thus minimizing disruption of the original food product.

In accordance with another aspect of the invention, the high concentration β-glucan food additive is provided in tablet form so as to be ingested directly as a dietary supplement.

In accordance with another aspect of the invention, a method of making a β-glucan enriched food product is provided that includes adding high concentration β-glucan food additive (generally having about 18–30% by weight β-glucan) derived from grain to another, different food component having no appreciable or less than a desired amount of β-glucan therein. Sufficient high concentration β-glucan is added to reach a desired concentration in the resulting food product. The β-glucan additive is composed of agglomerated particles, the particles forming the agglomeration typically being in the size range of from about 44 mμ to about 150 mμ and the agglomerated particles being in the size range of from about 75 mμ to about 840 mμ. The agglomerated β-glucan food additive is then uniformly dispersed into the food component. The other food component generally may be either solid or liquid and may be selected from a wide range of food products. The concentration of β-glucan in the total food product typically is in the range of 0.1% to 20% by weight and preferably is in an amount sufficient to provide from about 0.75 to about 3.0 grams of β-glucan per individual serving size of the food product.

In accordance with another aspect of the invention, a food product containing the high concentration β-glucan food additive derived from a grain product is provided. The food product can be as previously described. Generally, the β-glucan enriched food product has a 0.1% to 20% by weight β-glucan content and preferably is uniformly dispersed within the food product.

DETAILED DESCRIPTION OF THE INVENTION

Figure 1:
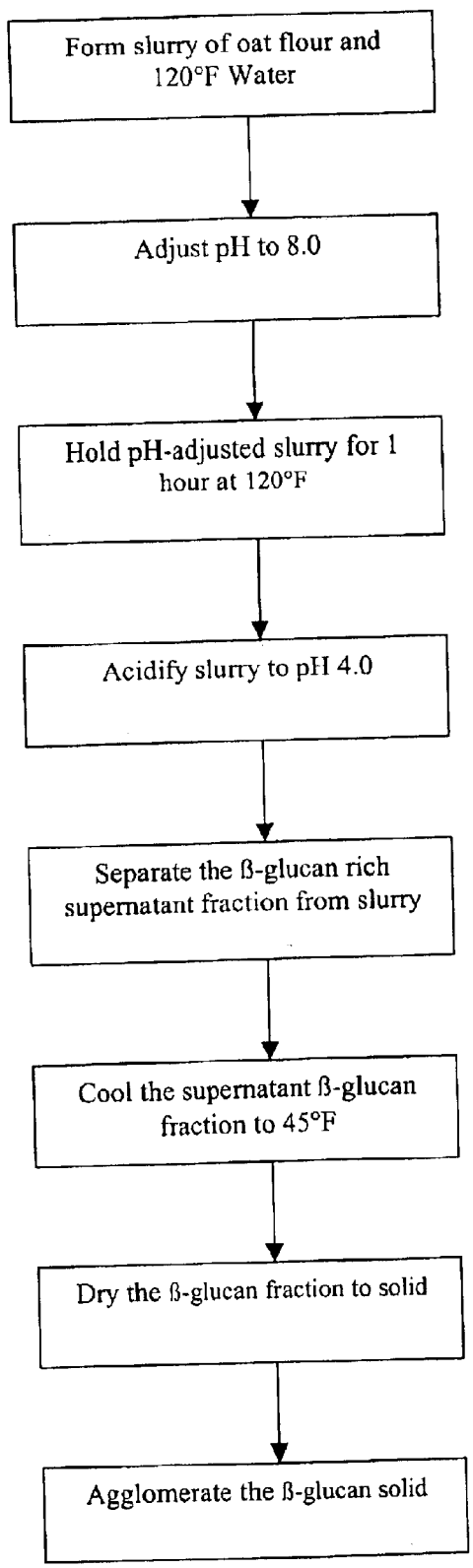
FIG. 1 is a flow diagram depicting the β-glucan extraction process described in the Example.

β-glucan is a cell wall polysaccharide comprising D-glucan units and is the main structural material in the cell walls of barley and oat grain. Use of the term β-glucan is intended to refer to the name of a non-starchy polysaccharide in which individual glucose molecules, or glucans, are linked by β(1→3) linkages, β(1→4) linkages or a mix of β(1→3), β(1→4) linkages.

Any cereal grain with a β-glucan component therein may be used as a starting material in the present invention. Such cereal grains include, but are not limited to, barley, oats, wheat, rice, rye, corn, sorghum and millet. Typically, these cereal grains have a relatively low concentration of β-glucan. Oats and barley are preferred because of their higher levels of naturally occurring β-glucan. For example, oat grain has a 4% by weight β-glucan content while barley grain has a 5–7% by weight β-glucan content.

Any processed grain product may likewise be utilized as a starting material in the present invention. Processed cereal grain products include, but are not limited to, cereal flour, cereal flakes, cereal bran, defatted grain, and mixtures of grains including grain flour or grain fractions. For example, it is commonly known in the art how to grind oat groat to separate the bran layers from the endosperm. This grinding results in oat flour comprising the endosperm and oat bran flour comprising the bran of the oat with some endosperm attached thereto. As β-glucan is found in the endosperm, whole oat flour and oat bran flour are preferred starting materials in the present invention for their high β-glucan content. Oat bran flour, for example, may contain up to 12.5% by weight β-glucan. Thus, compared to the final high concentration β-glucan product, a grain product with a relatively low β-glucan concentration would encompass any grain product, natural or processed, having about 13% or less by weight β-glucan content.

The extraction process of the present invention begins by forming a slurry of a relatively low concentration β-glucan grain product, preferably oat bran flour, in water. The slurry is then heated to an operating temperature, which is maintained within about 100–140° F., preferably about 110° F.–140° F., most preferably at about 120° F. but not exceeding about 140° F. The temperature should not degrade the β-glucan.

Base, typically as a basic aqueous solution, is then added to the aqueous slurry to adjust the pH to between 7.0 to 12.0, preferably to between about 7.0 to 10.0 and more preferably 7.0 to 9.0 or 7.9 to 8.1. The base will generally be an inorganic base such as, but not limited to, NaOH, KOH, $NaHCO_3$, or $Na_2CO_3$. The pH-adjusted slurry is then held in the operating temperature range, preferably at about 120° F. for 50 to 120 minutes and preferably for 50 to 75 minutes and more preferably 50 to 60 minutes. The time and specified conditions allow for extraction of at least 50% and preferably more than 80% of the β-glucan from the grain product cell wall. The extraction reaction is then terminated by acidifying the pH-adjusted slurry to a pH of less than 5.0, preferably to a pH between 4.2 to 4.8. Any suitable inorganic acid may be used to acidify the slurry such as, but not limited to, $H_2SO_4$, $HNO_3$, $H_2CO_3$, or preferably HCl.

After acidification, the β-glucan rich supernatant fraction can be immediately separated from the solid grain cell tissue components by means of decantation, centrifugation, or a combination thereof to provide a β-glucan concentration on a dry weight basis of at least about 18%. The β-glucan fraction is then cooled to a temperature in the range of 40° F. to 50° F., preferably 45° F. and subsequently concentrated by evaporation. The concentrated β-glucan fraction is then dried, preferably by spray drying. The particle size of the β-glucan product after drying is in the range of about 44 mμ to about 150 mμ. These particulates are then bound in any suitable manner to form a β-glucan product agglomeration. The agglomerated particles are in the size range of from about 75 mμ to about 840 mμ. The β-glucan content of the resultant product is at least 18%, preferably at least 20% to 30%, by weight β-glucan. The agglomerated form of β-glucan in accordance with the invention is formed by any suitable method, and preferably by fluidized bed agglomeration done either on a batch or a continuous basis. Typically, water is used to cause the small particles to agglomerate in the agglomeration process.

The advantages of this β-glucan product are that it has a minimum of 18% β-glucan and is readily soluble. This provides a high concentration β-glucan product with improved flexibility for formulating higher concentrations of β-glucan. The high concentration β-glucan product may also serve as a stand-alone dietary supplement whether in tablet, agglomerated or particulate form.

The high concentration β-glucan product is particularly useful as a food additive. The extraction process removes substantially all of the insoluble grain material in the production of the high concentration β-glucan product. Absence of grain fiber insolubles and the concomitant higher β-glucan content in the β-glucan food additive requires less β-glucan food additive to be incorporated into a target food product in order to impart the nutritional benefits of β-glucan into the food product. Correspondingly, adding less β-glucan food additive reduces the possibility of adversely affecting the texture, taste or mouthfeel of the β-glucan enriched food product.

Agglomeration of the β-glucan product further enhances the usefulness of the β-glucan food additive. Agglomeration increases the ability of the β-glucan food additive to be dispersed in both solid and liquid food applications. This is particularly advantageous when applying the β-glucan food additive to liquid food products. The agglomerated high concentration β-glucan food additive readily dissolves in water thereby minimizing any adverse effects the β-glucan food additive may have on the liquid food's viscosity, taste, texture and mouthfeel while simultaneously imparting the nutritional benefits of β-glucan to the liquid food product. Addition of the agglomerated high concentration β-glucan food additive to either a solid or liquid food can increase the β-glucan content to 0.1% to 10% or more by weight of the overall food composition.

EXAMPLE

In a mix tank, 400 pounds of oat bran flour were added to 750 gallons of 120° F. soft water to form an aqueous 6% solids slurry. The oat bran flour can be obtained from sources known to the skilled artisan such as The Quaker Oats Company located in Chicago, Ill. To the slurry was added 17 ounces of 50% NaOH solution diluted to three gallons. Addition of NaOH solution adjusted the pH of the slurry to 8.0. The pH-adjusted slurry was then transferred to an extraction tank, maintained at 120° F. and agitated for one hour. Acidifying the pH-adjusted slurry with 40 gallons dilute HCl (7 liters of 28 Be' HCl diluted to 40 gallons) lowered the slurry pH to 4.5.

The slurry was first decanted and then centrifuged to remove the solid particulates from the β-glucan rich supernatant fraction. Thereupon, the decantate was added to the supernatant fraction and was then cooled to 45° F. Water was evaporated to condense the combined fraction to about 7–8% solids. Five #68/21 nozzles at 4000 psig were used to spray dry the β-glucan product to a solid. This solid had a particle size range of 44 mµ to 150 mµ. The solid β-glucan product was subsequently agglomerated to a particle size ranging from 75 mµ to 840 mµ.

This process recovered 80% of the β-glucan present in the initial oat bran concentrate. The chemical composition of the resulting high concentration β-glucan product was as follows:

| Component | Percent of Total |
| --- | --- |
| Available Carbohydrates | 51.52% |
| Insoluble Dietary fiber | 0.77% |
| Soluble Dietary Fiber | 22.98% |
| Total Dietary Fiber | 24.37% |
| Protein | 17.28% |
| Total Ash | 0.17% |
| Moisture-Oven | 6.54% |
| Fat as Triglycerides | 7.08% |
| Beta-Glucan | 19.38% |

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A food additive derived from grain and comprising β-glucan present in a concentration in the range of from about 18% to about 30%;
    said food additive being composed of agglomerations of particles, said particles being in the size range of from about 44 mµ to about 150 mµ and said particles being readily dispersible in food products.

2. The food additive of claim 1 wherein said agglomerations are in the size range of from about 75 mµ to about 840 mµ.

3. The food additive of claim 1 wherein said food additive is in tablet form.

4. A food product comprising:
    a combination of at least one food component; and
    a high content β-glucan food additive uniformly dispersed in said food component and present in sufficient amount such that the concentration of the β-glucan present in the food product from the additive is in the range of from about 0.1 to about 20.0% by weight of the total food product, said β-glucan food additive being derived from grain and composed of from about 18–30% by weight β-glucan.

5. The food additive of claim 2 wherein the agglomerations are formed by water-bound particles.

6. The food additive of claim 1 wherein the food additive is water soluble.

7. The food additive of claim 1 wherein the β-glucan includes substantially no insoluble grain material.

8. The food product of claim 4 wherein said food component is selected from the group consisting of a solid food, a semi-solid food, a liquid food and a semi-liquid food.

9. The food product of claim 4 wherein the food component comprises meat.

10. The food product of claim 4 wherein the food component comprises cheese.

11. The food product of claim 4 wherein the food component comprises fish.

12. The food product of claim 4 wherein the food component comprises poultry.

13. The food product of claim 4 wherein the food component comprises eggs.

14. The food product of claim 4 wherein the food component comprises a beverage.

15. The food product of claim 4 wherein the food component comprises a baked good.

16. The food product of claim 4 wherein the food component comprises a beverage mix.

17. The food product of claim 4 wherein the food component comprises a health bar.

18. The food product of claim 4 wherein the food component comprises a nutritional supplement.

19. The food product of claim 8 wherein said food component comprises a liquid food with the β-glucan food additive dissolved in the liquid food.

20. The food product of claim 4 wherein the β-glucan additive is water soluble.

21. The food product of claim 4 further comprising about 0.75 g to about 3.0 g β-glucan per serving.

22. A food product comprising:
    at least one food component;
    a high content β-glucan food additive uniformly dispersed in said food component and present in sufficient amount such that the concentration of the β-glucan present in the food product is in the range of from about 0.1 to about 20.0% by weight of the total food product, wherein said β-glucan food additive is derived from grain and composed of from about 18–30% by weight β-glucan, and wherein said food additive is composed of agglomerations of particles, said particles being in the size range of from about 44 mµ to about 150 mµ.

* * * * *